United States Patent [19]

Stockholm

[11] Patent Number: 5,293,579
[45] Date of Patent: Mar. 8, 1994

[54] METHOD AND APPARATUS FOR SMOOTHING JAGGED EDGES IN A GRAPHICS DISPLAY

[75] Inventor: John F. Stockholm, Palo Alto, Calif.

[73] Assignee: Ray Dream, Inc., Mountain View, Calif.

[21] Appl. No.: 838,605

[22] Filed: Feb. 18, 1992

[51] Int. Cl.$^5$ ............................................. G06K 9/48
[52] U.S. Cl. .................... 382/22; 358/447; 382/54
[58] Field of Search ............ 382/22, 54, 27, 50; 358/447, 448, 455; H04N 1/40

[56] References Cited

U.S. PATENT DOCUMENTS

| | | | |
|---|---|---|---|
| 4,506,382 | 3/1985 | Hada et al. | 382/27 |
| 4,742,399 | 5/1988 | Kitamura | 382/27 |
| 4,827,533 | 5/1989 | Tanaka | 382/27 |
| 5,023,919 | 6/1991 | Wataya | 382/54 |
| 5,050,227 | 9/1991 | Furusawa et al. | 382/54 |
| 5,060,082 | 10/1991 | Matsumoto et al. | 382/54 |
| 5,091,967 | 2/1992 | Ohsawa | 382/22 |
| 5,091,973 | 2/1992 | Watanabe | 382/22 |
| 5,093,870 | 3/1992 | Watanabe | 382/22 |
| 5,105,472 | 4/1992 | Murayama | 382/22 |
| 5,111,285 | 5/1992 | Fujita et al. | 382/22 |
| 5,151,787 | 9/1992 | Park | 382/22 |
| 5,204,918 | 4/1993 | Hirosawa | 382/22 |

Primary Examiner—Joseph Mancuso
Attorney, Agent, or Firm—Skjerven, Morrill, MacPherson, Franklin & Friel

[57] ABSTRACT

A method and apparatus for detection and smoothing of jagged edges in a graphics display is described. The edge detection and smoothing is done using only a pixel-map representation of the pixel colors of the image as input. Edges are detected based upon the color representations of certain groups of pixels. Smoothing of the edges is accomplished by adjusting the color of certain pixels in the region of a detected edge. Edges are detected by successively scanning either sets of two rows or sets of two columns of pixels. Edge detection occurs during the row or column scans by discerning certain sequences of color changes between pairs of adjacent pixels. Color changes are detected only if certain threshold changes in color occur between pairs of adjacent pixels. Unless the threshold color change is exceeded, pixels are considered to be the same color and no edge is detected. Jagged edges are detected and smoothed regardless of the type of color representation used in the pixel-map. The pixel-map may represent, for instance, the color of each pixel as a combination of shades of red, green or blue, a combination of varying degrees of hue, brightness and saturation, or some other combination.

6 Claims, 8 Drawing Sheets

Figure 5(a)
Bottom Edge

Figure 5(b)

Figure 5(c)
Descending Edge

Figure 5(d)

Figure 5(e)
Ascending Edge

Top Edge

No Edge

METHOD AND APPARATUS FOR SMOOTHING JAGGED EDGES IN A GRAPHICS DISPLAY

BACKGROUND OF THE INVENTION

1. Field of the Invention

This invention relates to a method and apparatus for smoothing jagged edges that appear at the interface between different colors in a graphics display.

2. Prior Art

There are two ways to numerically describe a graphics image. The first, typically referred to as vector graphics, represents the image as a combination of points, lines, arcs and other geometric shapes. Each of these components of the image is then successively and cumulatively displayed by an image display device until the complete image is generated.

The second method, typically referred to as raster graphics, represents the image as a rectangular display of minute picture elements ("pixels"). A display screen consists of thousands of tiny dots of color. A pixel may be one dot (as in monochrome monitors), a group of three or four dots (as in color monitors), or a somewhat larger cluster of dots. Here, a pixel will be treated as the smallest region of necessarily uniform color in a graphics image.

Figure 1A:
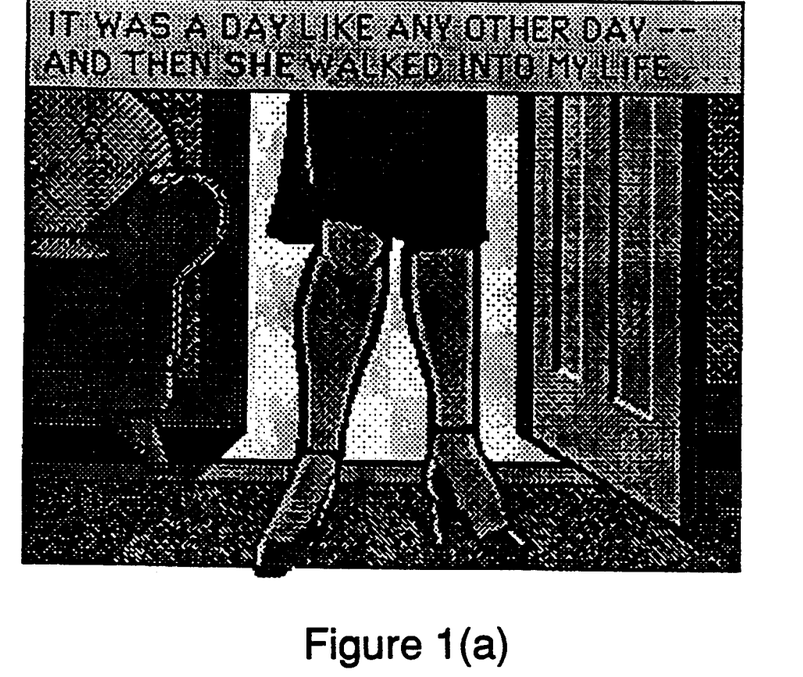
FIG. 1(a) shows an image with jagged edges present.
Figure 1B:
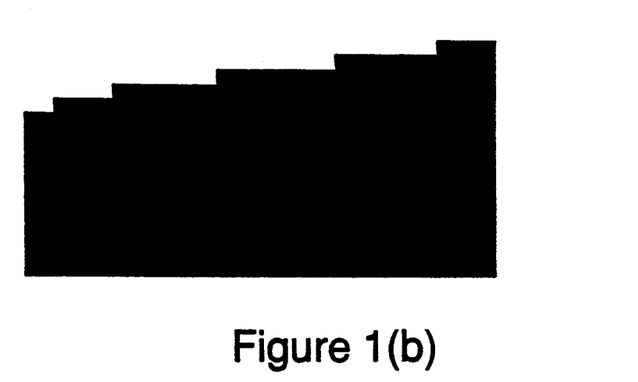
FIG. 1(b) shows a detailed section of an image with jagged edges present.

Pixels are rectangular (usually square) in shape. As a result, images represented in a pixel-based display are often plagued by a staircase effect apparent in diagonal lines of the image. As a result, some diagonal lines do not appear smooth in the display. FIG. 1(a) shows an image that suffers from the staircase effect. Note, for instance, how the legs in the image have a jagged, rather than smooth, appearance. FIG. 1(b) shows a detailed portion of an image illustrating the staircase effect. As can be seen, the square shape of individual pixels precludes representing diagonal lines of a display in a continuous manner, but, rather, necessitates that these lines be represented as successive discrete jumps from one horizontal (or vertical) level to another. FIG. 1(b) illustrates clearly that the approximate representation of diagonal lines by a pixel-based graphics system results in a "line" that looks like a staircase.

Some previous attempts to solve the "jaggies" problem have employed techniques known as signal processing. These techniques (also known as anti-aliasing), derived from similar techniques employed in audio signal processing, utilize fast Fourier transforms and frequency filtering to eliminate jagged edges. Typically, a three step procedure is used.

In the first step, the set of pixel color representations is transformed into a set of frequency representations. If, for instance, the pixel color grid consists of 10,000 pixels, then the 10,000 pixel color representations are transformed into 10,000 frequency representations. However, note that each pixel color representation maps does not map uniquely onto a particular frequency representation. Rather, each frequency representation is a combination of a plurality of pixel color representations.

In the second step, high frequencies are filtered from the set of frequency representations. This is accomplished by assigning a value of zero to frequencies above a certain level. This level is determined empirically as the level which yields the best image quality for "test" images.

In the third step, the set of filtered frequency representations is transformed back into a set of pixel color representations. The color of each pixel is reconstructed from a combination of a plurality of the filtered frequency representations. When the image is redrawn using the new pixel color representations, jagged edges in the image appear to be smoothed.

There are problems with signal processing techniques. First, these techniques are global in effect. That is, they cannot operate only on selected portions of the image (i.e., those portions with jagged edges). As a result, signal processing techniques, while smoothing jagged edges, also smooth the rest of the image as well. Consequently, the anti-aliased image is blurred as compared to the original image.

Second, the input used in these techniques is undesirably limited. The anti-aliased color representation of each pixel may only be affected by nearby pixels (i.e., pixels that are one or two pixels away). Therefore, lines that are either very gently or very steeply sloped may not be adequately smoothed since the signal processing technique may "perceive" them as horizontal or vertical.

Other prior attempts to eliminate jagged edges have involved changing the color of individual pixels in a more localized way, based upon information regarding the content of the image that is known prior to smoothing. The known information is a description of the image as a combination of various mathematical shapes, e.g., squares, rectangles, triangles, circles. Rather than being described on a pixel-by-pixel basis, the image is described by specifying key information for each of the geometric shapes comprising the image. For instance, a circle would be described by giving the location of its center and the magnitude of its radius.

Smoothing of jagged edges in the image is performed in the following way. Using the known mathematical information describing the image, the image is recreated using an expanded temporary pixel grid. For example, the temporary pixel grid might be four times as large as the original pixel grid (i.e., the temporary grid has 4 times as many pixels in both directions of the pixel plane). A correspondence exists between pixels in the original grid and blocks of pixels in the temporary grid. In the case where the temporary grid is four times the size of the original grid, a 4×4 array of pixels in the temporary grid corresponds to each pixel of the original grid.

In the original image, pixels near an edge will take on one of the two edge colors. When the image is redrawn on the expanded temporary pixel grid, each pixel in the original grid will correspond to a 4×4 array of pixels in the temporary grid. Some of the pixels in that "edge pixel array" will take on one of the edge colors and some will take on the other edge color. The important point to note is that for each 4×4 pixel array representing an edge pixel in the original image, not all of the pixels of the array will be of one color.

After the image is converted to the expanded temporary pixel grid, for those pixel arrays representing edge pixels in the original pixel grid, a ratio is calculated representing the fraction of pixels of one color out of the total number of pixels in the array. So, for example, in an edge pixel array with black and white as the edge colors, the fraction of either black or white pixels will be N/16 where 0<N<16. This information representing the fractional color composition of the 4×4 edge pixel arrays in the expanded pixel grid is then used to modify the original pixel grid. Using the previous example, with black and white as edge colors, a particular edge pixel in the original grid is changed to be some shade of gray, rather than being either black or white as in the original image. For instance, an edge pixel in the original grid corresponding to a 4×4 array in the temporary grid that contains 13 black pixels and 3 white pixels, would be changed to a relatively dark shade of gray in the smoothed image. In this way, the color of edge pixels in the original image is adjusted to smooth the transitions between colors at feature edges.

While this approach has an advantage over the signal processing approach in that it smoothes only selected portions of the image, rather than the entire image, thus avoiding blurring of the image, there are problems with such techniques. First, the approach is limited in application. It may only be used when the features in a particular image are known prior to application of the smoothing method, and these features may be described as combinations of simple geometric shapes. Thus, this method is not useful in smoothing jagged edges in complex images.

Second, this approach requires "pre-processing" of the image to provide a more synthesized representation than that afforded by a rudimentary pixel-map representation of the image. This type of approach will not work if only a simple pixel-map representation of the pixel grid exists, i.e., if only the characteristics of each pixel are known and no information regarding the relationship of one pixel to another is known. This is because, when pixels in the original grid are mapped onto a 4×4 pixel array in the expanded pixel grid, the pixel representation is not refined in any way. In other words, all of the pixels in each 4×4 array will be the same color as the corresponding pixel in the original grid. When the expanded pixel grid is mapped back on to the original grid, the color of each pixel in the original grid remains the same.

This does not occur in the prior method described, because transferring the original grid on to an expanded grid refines the pixel representation near edges. Some of the pixels in each 4×4 edge pixel array will be one color, some another. Thus, when the image is retransferred to the original grid, the color of edge pixels changes from the original color. The additional information known about the image (i.e., composition of the image as a sum of various mathematical shapes) is used to refine the image representation in an expanded grid, and this refinement is, in turn, used to smooth edges when the image is redisplayed using the original pixel grid.

SUMMARY OF THE INVENTION

In accordance with this invention, jagged edges in a graphics display are detected and smoothed. The edge detection and smoothing is done using only a pixel-map representation of the pixel colors of the image as input. No signal processing (i.e., techniques using fast Fourier transforms and frequency filtering) is used to smooth the image. No mathematical information (other than the pixel color pixel-map) need be used as input in order to accomplish the smoothing. Edges are detected based upon the color representations of certain groups of pixels. Smoothing of the edges is accomplished by adjusting the color of certain pixels in the region of a detected edge. Only pixels in the region of an edge are smoothed; other pixels are left unadjusted by the smoothing process.

The invention has several advantages over prior art techniques. It avoids blurring of the image in regions that do not include jagged edges and that are therefore not smoothed. It will also always detect edges with very steep or very flat slopes. Further, edges can be smoothed in images of any degree of complexity since the invention requires only individual data as input. Since individual pixel data is used as input, pre-processing of the image to reinterpret it at a higher level of abstraction (e.g., as a composite of mathematical shapes) is unnecessary.

In one embodiment according to the invention, edges are detected by successively scanning either sets of two rows or sets of two columns of pixels. Edge detection occurs during the row or column scans by discerning certain sequences of color changes between pairs of adjacent pixels. When these sequences occur, an edge is detected. Edges are then smoothed, either immediately after detection of each edge or after all edges have been detected in the entire image.

In another embodiment according to the invention, edges are detected in a graphics image only if certain threshold changes in color occur between pairs of adjacent pixels. Unless the threshold color change is exceeded, pixels are considered to be the same color and no edge is detected. This avoids unnecessary smoothing that would provide no practical benefit, but would create undesirable blurring of the image.

In another embodiment according to the invention, jagged edges in a graphics display are detected and smoothed, using only a pixel-map representation of pixel color, regardless of the type of color representation used in the pixel-map. The pixel-map may represent, for instance, the color of each pixel as a combination of shades of red, green or blue, a combination of varying degrees of hue, brightness and saturation, or some other combination. The type of color representation is significant only in specifying a threshold color change that must be exceeded in order to detect a color change between pixels, and in specifying how two edge colors will be mixed to change the colors of pixels in the region of the edge during smoothing. Thus, the invention has the advantage of being easily adaptable to any type of color representation that may be imposed by a particular external system that employs the invention for smoothing edges in a display.

DETAILED DESCRIPTION OF THE PREFERRED EMBODIMENTS

Figure 2:
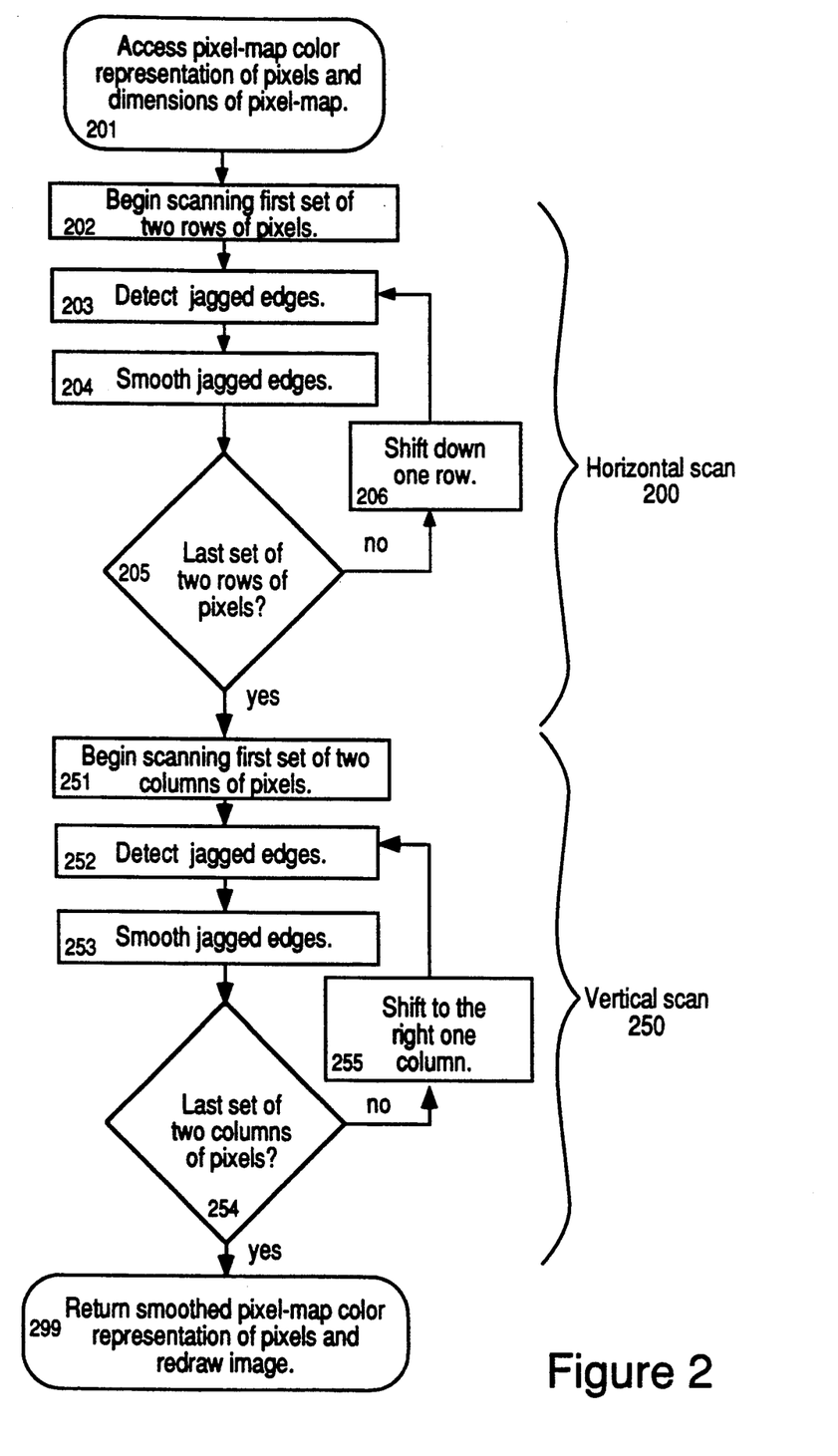
FIG. 2 is a block diagram of a method for smoothing jagged edges in an image according to an embodiment of the invention.

FIG. 2 shows a block diagram of a method for detecting and smoothing jagged edges in a graphics display according to one embodiment of the invention. A pixel-map representation of the pixel grid, and data indicating the number of rows and columns in the pixel grid, exist on a non-volatile storage medium (such as a disk drive) prior to application of the method. The pixel-map consists of a numerical representation corresponding to a particular color for each pixel location in a rectangular pixel array.

It is important to note that any numerical representation of color may be used. Thus, for example, in one embodiment of the invention the color of a pixel may be represented as a combination of various shades of three colors: red, green and blue. Each of the shades of these three component colors may be represented by, for instance, unsigned 8 bits in a computer memory (i.e., a number from 0 to 255). Each number from 0 to 255 would represent a level of intensity for the particular color in question. So, 0 could represent the absence of a particular color, in which case 255 would represent the maximum intensity of that color. Intermediate numbers would represent intermediate intensity levels for the particular color. Thus, according to this scheme, pure, bright red would be represented by a sequence of three numbers: 255, 0, 0. White would be represented by the sequence of numbers 255, 255, 255. Black would be represented by the sequence of numbers 0, 0, 0. Gray would be represented by the sequence of numbers 128, 128, 128.

Instead of the three color representation described above, the color of each pixel may be described as a combination of four colors, e.g., cyan, yellow, magenta, and black ("CYNK"). Alternatively, the color of each pixel may be represented as a combination of its hue, brightness and saturation. The invention encompasses these representations of color as well as any others that might be used. No matter what color representation may be dictated by a particular hardware or software system, this representation may be expressed as a sequence of one or more numbers. The invention can use any of these numerical representations of color and is not dependent on any particular type of color representation.

In one embodiment according to the invention, the numerical representation of pixel colors, and the data indicating the number of rows and columns in the pixel grid, are transferred from the non-volatile storage medium to a RAM. This data is then accessed from the RAM as shown by block 201 in FIG. 2. However, it is to be understood that access directly to the non-volatile storage medium to retrieve pixel data is also within the ambit of the invention.

Pixel locations in the pixel grid are represented by an array of row and column specifications. Thus, in one embodiment according to the invention, each pixel location is specified as a row number and a column number, each of which may range in value from 0 to one less than the number of rows or columns in the pixel grid (as appropriate). Further, in an embodiment according to the invention, pixel data is accessed beginning with pixel locations in the upper left corner of the pixel grid. The pixel data is processed first in a horizontal data scan 200, then in a vertical data scan 250. The pixel data is processed in groups of either two lines or two columns at a time depending on whether horizontal scan 200 or vertical scan 250 is being performed. To begin, the top two horizontal lines of the image are processed as shown by block 202. When the end of those lines is reached, as determined by block 205 the method decrements one line and begins processing the next two lines (i.e., lines 2 and 3) as shown by block 206. This process is repeated until all horizontal lines have been processed. At this point, the vertical scan 250 begins. The leftmost two columns (columns 1 and 2) of the image are processed as shown by block 251, then columns 2 and 3, then columns 3 and 4, and so on until all columns of the image have been scanned.

Note that, though the above embodiment is described so that the horizontal scan 200 is made from left to right, the horizontal scan 200 could also be made from right to left. Likewise, the vertical scan 250 could be made from either the top line to the bottom line or the bottom line to the top line. Further, any combination of these possibilities could be used. Finally, though this embodiment of the invention has been described with the horizontal scan 200 performed first, the vertical scan 250 could be performed first instead.

As can be seen in FIG. 2, the horizontal scan 200 and vertical scan 250 are similar. For this reason, the rest of the description will describe primarily the horizontal scan portion 200 of embodiments of the invention. It is to be understood that the vertical scan portion 250 of these embodiments operates in an analogous way.

The horizontal scan 200 is comprised of two main parts: detection of jagged edges 203 and smoothing of jagged edges 204. In the edge detection portion 203 of the scan 200, pixel data in sets of two rows are considered column by column starting from the leftmost column and moving to the right. As the data in each new column of two pixels is considered, it is compared to the data in the previous column of two pixels (this is explained in greater detail below).

Assuming, for purposes of illustration, that the only colors in an image are white and black, Table 1 shows all of the possible combinations of two successive columns of pixels. The first column in Table 1 defines the relationship between the colors of the top and bottom pixels immediately prior to the column of two pixels currently being considered. The second column in Table 1 defines the relationship between the colors of the current top and bottom pixels. The third column in Table 1 defines the relationships between previous and current top pixels and previous and current bottom pixels. The fourth column in Table 1 shows a pixel representation of the two possibilities defined by each of the sets of relationships given in the first three columns. (Note that in an actual graphics display, adjacent pixels would touch one another, rather than be separated as in Table 1.) As can be seen, sixteen distinct possibilities exist for a 4 pixel square in which each pixel is constrained to be one of two colors. However, there are only eight meaningfully distinct possible combinations, each of these eight corresponding to one of the sets of relationships given in the first three columns. Each of the two possibilities shown in each row of Table 1 are identical for purposes of detection of edges according to the invention. Thus, for instance, in row 5 of Table 1, it is immaterial whether the upper left pixel is white or black; the important point is that in each of the two possible representations, the same type of relationship exists between two different colors that are adjacent to one another in the image.

TABLE 1

Possible Pixel Representations for 4 Pixel Square

| | | | | |
|---|---|---|---|---|
| 1. TP = BP | TC = BC | (TC=BC) = (TP=BP) | ■■<br>■■ or | □□<br>□□ |
| 2. TP = BP | TC = BC | (TC=BC) ≠ (TP=BP) | ■□<br>■□ or | □■<br>□■ |
| 3. TP = BP | TC ≠ BC | TC≠TP (BC=BP) | ■□<br>■■ or | □■<br>□□ |
| 4. TP = BP | TC ≠ BC | TC=TP (BC≠BP) | ■■<br>■□ or | □□<br>□■ |
| 5. TP ≠ BP | TC = BC | TC≠TP (BC=BP) | □■<br>■■ or | ■□<br>□□ |
| 6. TP ≠ BP | TC = BC | TC=TP (BC≠BP) | □□<br>■□ or | ■■<br>□■ |
| 7. TP ≠ BP | TC ≠ BC | (TC=TP) ≠ (BC=BP) | □□<br>■■ or | ■■<br>□□ |
| 8. TP ≠ BP | TC ≠ BC | (TC=BP) ≠ (BC=TP) | □■<br>■□ or | ■□<br>□■ |

TP = color of previoius top pixel
BP = color of previous bottom pixel    [TP] [TC]
TC = color of current top pixel
BC = color of current bottom pixel    [BP] [BC]

Depending upon the outcome of the comparison of the two columns of pixels, information regarding that outcome may be retained for future use. More specifically, as will be appreciated in the discussion below and by considering Table 2, when either of the situations shown in rows 3 and 4 of Table 1 occur, the occurrence of such a situation will be noted. As can be seen from Table 1, these two situations comprise a first column of pixels of uniform color, followed by a second column of pixels in which the color of either the top or bottom pixel, but not both, changes.

After consideration of a set of 4 pixels, a new set of 4 pixels is compared. The former current top and bottom pixels become the previous top and bottom pixels. The pixels immediately to the right of these pixels become the current top and bottom pixels. Again, this 4 pixel square is described by one of the 8 possible representations shown in Table 1. A comparison is made between the two columns of pixels.

Certain combinations of two successive outcomes resulting from these successive comparisons between two columns of pixels (i.e., 4 pixel square representations) will constitute the detection of an edge. The first of the two successive outcomes represents the beginning of the edge and the second represents the end of the edge. Note that these two successive outcomes need not occur immediately one after the other. Any number of comparisons of columns of pixels may occur between the two successive outcomes that represent the detection of an edge, constrained only by the requirement that the two successive outcomes occur in the same set of two rows of pixels. In other words, there may be any number of pixel columns between the beginning and the end of the edge, subject only to the limitation imposed by the horizontal length of the pixel grid.

Table 2 shows all of the possible combinations of two successive 4 pixel squares (i.e., three successive columns of pixels). In Table 2, the first two columns (labelled "First Pass" and "Second Pass," respectively) each indicate one of the eight possible 4 pixel square representations shown in Table 1. The combination of First Pass and Second Pass results in a 6 pixel array (2 rows, 3 columns) in which the middle column of pixels is shared by the First Pass and Second Pass 4 pixel squares. The third column (labelled "Description") briefly describes the result of a particular combination of First Pass and Second Pass. The fourth column (labelled "Pixel Representation") shows the two possible pixel representations for each possible combination of First Pass and Second Pass.

Table 2, then, shows all of the possible combinations of two successive outcomes that may occur for pixels that can only take on one of two colors. Again, though the table shows only three columns of pixels for each case, it is to be understood that a variable number of columns of pixels, in which no pixel color change occurs between adjacent columns of pixels, may lie between the first and last column of the sets of pixels shown. Thus, for instance, in the table entry with a First Pass type of 2 and a Second Pass type of 4, there may be a plurality of columns of pixels of uniform color (either both pixels of each column black or both white) lying between the first and last columns of pixels, rather than the single column of uniform color shown in the Table.

TABLE 2

Possible Combinations Resulting From Successive Comparisons of Sets of 4 Pixels During a Horizontal Scan

| First Pass | Second Pass | Description | Pixel Representation | | |
|---|---|---|---|---|---|
| 1 | 1 | Solid | ■■■<br>■■■ | or | □□□<br>□□□ |
| 1 | 2 | Find in vertical scan | ■■□<br>■■□ | or | □□■<br>□□■ |
| 1 | 3 | Inconclusive - continue to search for bottom or descending edge | ■■□<br>■■■ | or | □□■<br>□□□ |
| 1 | 4 | Inconclusive - continue to search for top or ascending edge | ■■■<br>■■□ | or | □□□<br>□□■ |
| 1 | 5-8 | Not possible | — | | |
| 2 | 1 | Find in vertical scan | ■□□<br>■□□ | or | □■■<br>□■■ |
| 2 | 2 | Find in vertical scan | ■□■<br>■□■ | or | □■□<br>□■□ |
| 2 | 3 | 1. Find in vertical scan<br>2. Inconclusive - continue to search for bottom or descending edge | ■□■<br>■□□ | or | □■□<br>□■■ |
| 2 | 4 | 1. Find in vertical scan<br>2. Inconclusive - continue to search for top or ascending edge | ■□□<br>■□■ | or | □■■<br>□■□ |

TABLE 2-continued

Possible Combinations Resulting From Successive Comparisons of Sets of 4 Pixels During a Horizontal Scan

| First Pass | Second Pass | Description | Pixel Representation | | |
|---|---|---|---|---|---|
| 2 | 5-8 | Not possible | — | | |
| 3 | 1-4 | Not possible | — | | |
| 3 | 5 | Bottom edge | □■□ / □□□ | or | ■□■ / ■■■ |
| 3 | 6 | Descending edge | □■■ / □□■ | or | ■□□ / ■■□ |
| 3 | 7 | Inconclusive - continue to search for bottom or descending edge | ■□□ / ■■■ | or | □■■ / □□□ |
| 3 | 8 | Thin descending line | ■□■ / ■■□ | or | □■□ / □□■ |
| 4 | 1-4 | Not possible | — | | |
| 4 | 5 | Ascending edge | □□■ / □■■ | or | ■■□ / ■□□ |
| 4 | 6 | Top edge | □□□ / □■□ | or | ■■■ / ■□■ |
| 4 | 7 | Inconclusive - continue to search for top or ascending edge | ■■■ / ■□□ | or | □□□ / □■■ |
| 4 | 8 | Thin ascending line | ■■□ / ■□■ | or | □□■ / □■□ |
| 5 | 1 | Previously found ascending or bottom edge | □■■ / ■■■ | or | ■□□ / □□□ |
| 5 | 2 | 1. Previously found ascending or bottom edge 2. Find in vertical scan | □■□ / ■■□ | or | ■□■ / □□■ |
| 5 | 3 | 1. Previously found ascending or bottom edge 2. Inconclusive - continue to search for bottom or descending edge | □■□ / ■■■ | or | ■□■ / □□□ |
| 5 | 4 | 1. Previously found ascending or bottom edge 2. Inconclusive - continue to search for bottom or descending edge | □■■ / ■■□ | or | ■□□ / □□■ |
| 5 | 5-8 | Not possible | — | | |
| 6 | 1 | Previously found top or descending edge | □□□ / ■□□ | or | ■■■ / □■■ |
| 6 | 2 | 1. Previously found top or descending edge 2. Find in vertical scan | □□■ / ■□■ | or | ■■□ / □■□ |
| 6 | 3 | 1. Previously found top or descending edge 2. Inconclusive - continue to search for bottom or descending edge | □□■ / ■□□ | or | ■■□ / □■■ |
| 6 | 4 | 1. Previously found top or descending edge 2. Inconclusive - continue to search for top or ascending edge | ■■■ / □■□ | or | □□□ / ■□■ |
| 6 | 5-8 | Not possible | — | | |
| 7 | 1-4 | Not possible | — | | |
| 7 | 5 | Found either bottom or ascending edge | □□■ / ■■■ | or | ■■□ / □□□ |
| 7 | 6 | Found either top or descending edge | □□□ / ■■□ | or | ■■■ / □□■ |
| 7 | 7 | Inconclusive | □□□ / ■■■ | or | ■■■ / □□□ |
| 7 | 8 | Inconclusive | □□■ / ■■□ | or | ■■□ / □□■ |
| 8 | 1-4 | Not possible | — | | |
| 8 | 5 | Inconclusive | □■□ / ■□□ | or | ■□■ / □■■ |
| 8 | 6 | Inconclusive | □■■ / ■□■ | or | ■□□ / □■□ |
| 8 | 7 | Inconclusive | □■■ / ■□□ or | | ■□□ / □■■ |
| 8 | 8 | Inconclusive | □■□ / ■□■ | or | ■□■ / □■□ |

Note that some combinations are not possible. For instance, a first pass of type 2 and a second pass of types 5-8 can never occur because of the incompatibility of the pixel representations for those two types of passes occurring in that order. This may be verified by reference to Table 1.

Certain combinations yield inconclusive information. For instance, a first pass of type 1 and a second pass of type 3 is inconclusive. As may be appreciated from the pixel representations for this combination (and explained in more detail below), though it is known that either a bottom or a descending edge has been found, it cannot yet be stated with certainty which of the two edges has been located.

Some combinations of first pass and second pass indicate that an edge has been found that may only be detected in the vertical scan. For instance, a first pass of type 1 and a second pass of type 2 yields a transition in color of the top and bottom pixels at the same time. When this occurs, the edge is sufficiently steep (i.e., the edge is inclined at more than a 45° angle from the horizontal) so that it cannot be detected by the horizontal scan 200 (this is described in more detail below).

In still other combinations, the two different colors interface at two locations within the set of 6 pixels. For instance, if the first pass is of type 2 and the second pass is of type 3, it can be seen from the pixel representation shown in Table 2 that there are two interfaces between black and white regions. At the first interface, detection of an edge can only occur in the vertical scan. At the second interface, it can only be discerned that either a bottom or descending edge is present. Additional pixels must be considered in order to determine whether the edge is a bottom edge or a descending edge.

A combination of a first pass of type 1 and a second pass of type 1 indicates only that a solid is present. No edge detection information will be conveyed during either the horizontal or the vertical scans 200, 250 through the pixels of this region.

Finally, certain combinations will result in the detection of an edge. For instance, a first pass of type 3 and a second pass of type 5 will result in the detection of a bottom edge. It should be noted that it is not necessary that a pass of type 5 occur immediately after a pass of type 3 in order for a bottom edge to be detected. Several passes of type 7, for instance, might occur after the initial type 3 pass before the type 5 pass occurs and signals that a bottom edge has been detected.

As noted above, information regarding the outcome of certain comparisons between columns of pixels may be retained for future use. This occurs when there is a change in color of the pixels in one row. Thus, the detection of color changes between adjacent pixels is an important aspect of the operation of the invention.

As described previously, the color of each pixel may be described by a series of 8-bit sequences. Thus, a large number of different color representations are possible. Since there are so many possible colors that may be represented, gradations in color (even though perhaps very small) will exist between almost all pixels. Yet small differences in color may not be discernible to the eye. They may not constitute an edge between different colors for practical purposes. It is desirable, therefore, to eliminate smoothing of "bogus" edges that might otherwise be detected between pixels of virtually the same color.

In order to eliminate the detection of a change in color when that change is small, in one embodiment according to the invention, only changes greater than a certain threshold change will be considered a change in color for purposes of edge detection. This threshold is defined to be a specified percentage of the total range of color representation. This percentage is then expressed in a manner appropriate to the type of color representation. For instance, if the threshold is 10%, for an 8-bit representation of the color red, the magnitude of the change between successive pixels must be 26 ($0.10 \times 256$) in order to register as a color change.

Generally, the color of a pixel is the combination of the color components for a particular manner of color representation. However, for purposes of determining if a color change has occurred between adjacent pixels, each component of the color representation of a pixel is considered individually. Thus, in the example used above, each of the blue, red and green components of a pixel color is sequentially tested to see if any of the components changed by more than the threshold amount. If one of the components has changed by more than the threshold amount, then the color of that pixel is considered to have changed.

Figure 3A:
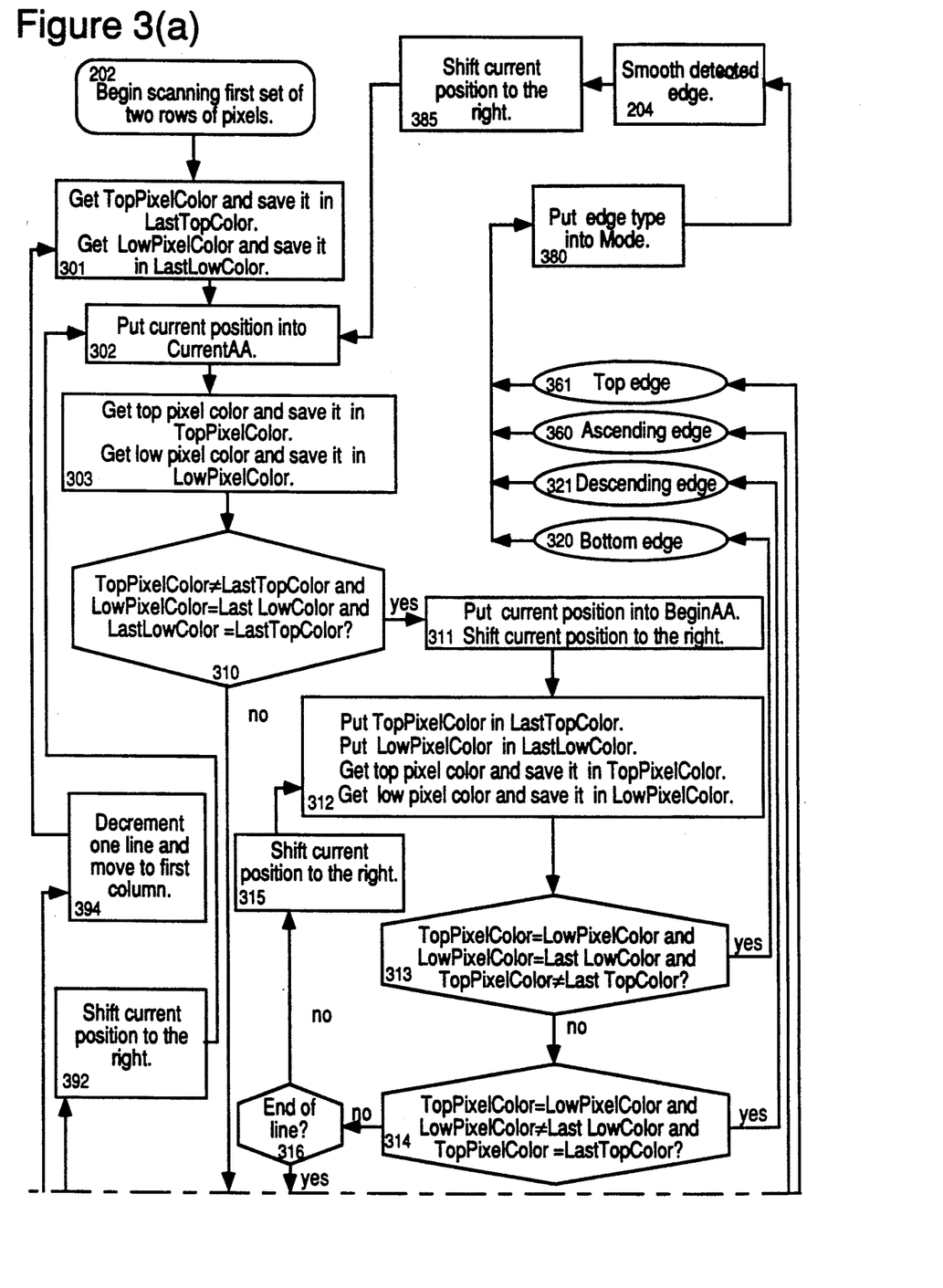
FIGS. 3(a) and 3(b) are block diagrams of the edge detection portion of the horizontal scan of the method shown in FIG. 2.
Figure 3B:
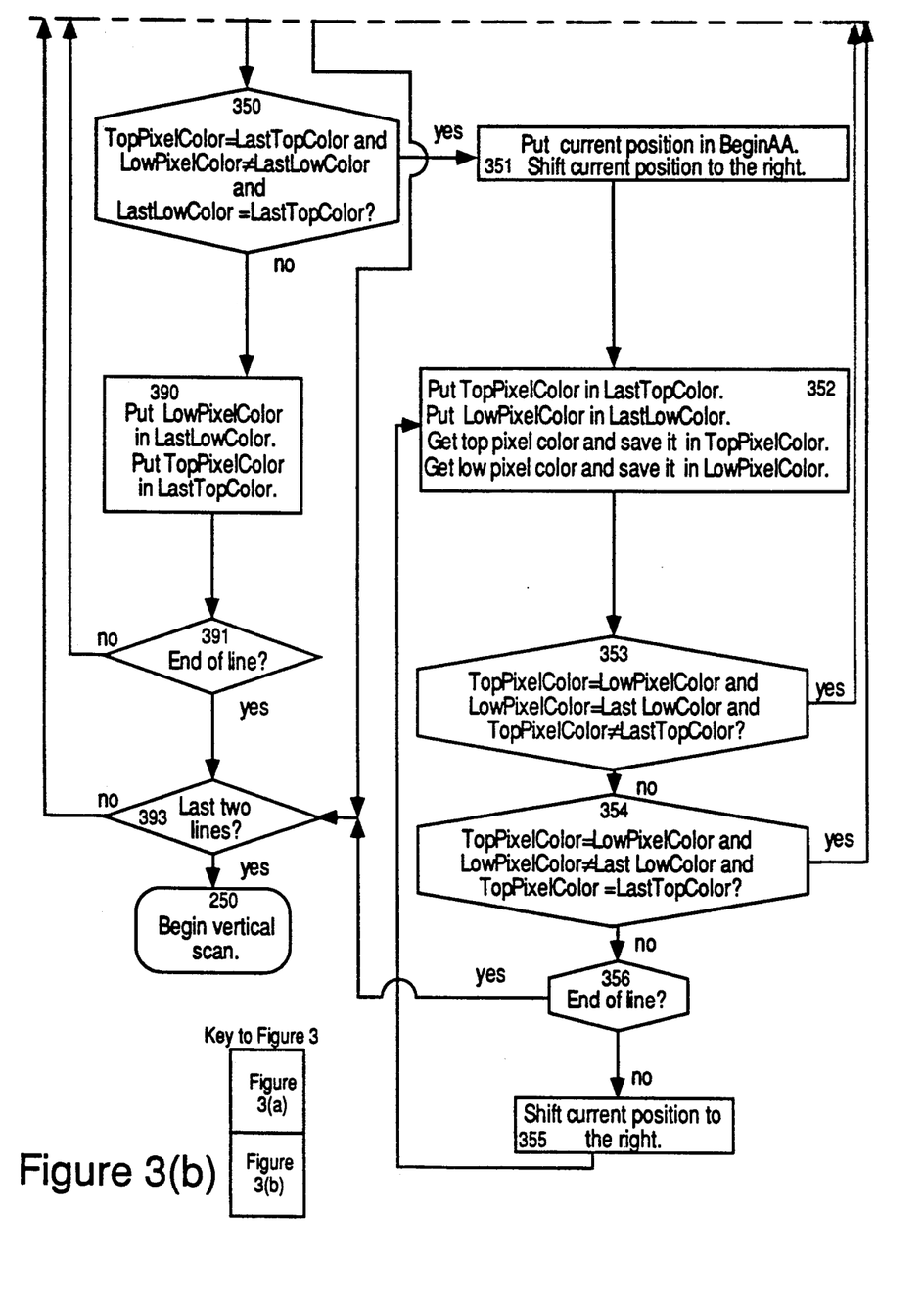

FIGS. 3(a)-3(b) show a block diagram of the edge detection portion 203 of the embodiment of the invention of FIG. 2. The data in the first column in the first two rows of pixel data is accessed as shown by Block 202. For the first column in each set of two rows, the data in the first row is saved a LastTopColor and the data in the second row is saved as LastLowColor as shown by block 301. (For the vertical data scan 250, an analogous step occurs for the first row of each set of two columns.)

The current position (column location) of this data is stored as CurrentAA as shown by block 302. The row location is not stored. It is assumed that successive sets of columns are from the same set of two rows. When this is not the case (i.e., when the end of a set of two rows is reached), this information is effectively assimilated by restarting edge detection again at block 301. Note that for the vertical scan 250, the current position is stored as a row location rather than a column location.

The data in the first row of column 1 is stored as TopPixelColor and the data in the second row of column 1 is stored as LowPixelColor as shown by block 303. Next, sets of three comparisons are performed, as shown by blocks 310, 313, 314, 350, 353 and 354 using the values stored in TopPixelColor, LowPixelColor, LastTopColor and LastLowColor. When the current position is the first column of a set of two rows, these comparisons are trivial. For this reason, these sets of three comparisons are not described here, but, rather, are described in more detail below. After the sets of three comparisons are made, LowPixelColor is stored in LastLowColor and TopPixelColor is stored in LastTopColor as shown by Block 390. a determination is made as to whether the end of the line (i.e., the last column) has been reached as shown by block 391.

If the last column of pixel data has not been reached, then the current position is shifted one position to the right, as shown by block 392, and stored in CurrentAA, as shown by Block 302. The data in the current column of row 1 is stored as TopPixelColor and the data in the current column of row 2 is stored as LowPixelColor as shown by block 303. A first set of three comparisons 310 are made. The first comparison is whether TopPixelColor is different from LastTopColor. The second comparison is whether LowPixelColor is the same as LastLowColor. The third comparison is whether LastLowColor is the same as LastTopColor. If the result of all three comparisons is affirmative, then either a descending edge or a bottom edge has been detected. If the result of any of the three comparisons is negative, then further comparisons must be made to detect whether an ascending or a top edge is present.

If a descending or bottom edge has been detected, the value in CurrentAA is stored in BeginAA, then the current position is shifted one column to the right and stored in CurrentAA as shown by block 311. The value of TopPixelColor is stored in LastTopColor and the value of LowPixelColor is stored in LastLowColor as shown by block 312. (Note that this results in the values from the immediately previous column being stored in LastTopColor and LastLowColor since new values for TopPixelColor and LowPixelColor, corresponding to the pixels of the now current column, have not been stored yet.) The data in the current column of row 1 is stored as TopPixelColor and the data in the current column of row 2 is stored as LowPixelColor as further shown by block 312.

Figure 5A:
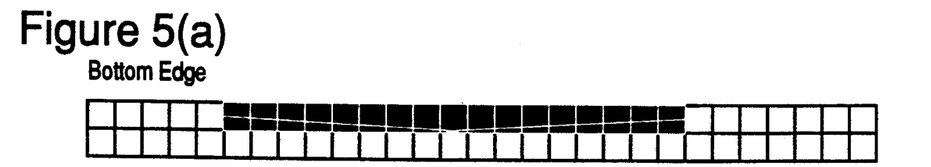
FIGS. 5(a) and 5(b), show two rows of pixels containing a bottom edge before and after, respectively, application of a smoothing method according to an embodiment of the invention.
Figure 5B:
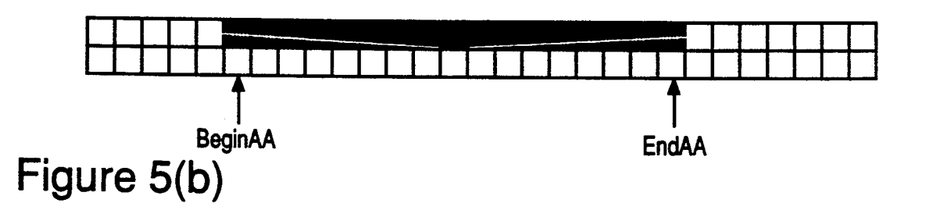

It must be determined whether the detected edge is a bottom edge or a descending edge. A second set of three comparisons 313 are made. The first comparison is whether TopPixelColor is the same as LowPixelColor. The second comparison is whether LowPixelColor is the same as LastLowColor. The third comparison is whether TopPixelColor is different from LastTopColor. If the result of all of these comparisons is affirmative, then a bottom edge has been detected as shown by block 320. This information is stored in Mode as shown by block 380. The presence of a bottom edge in two rows of pixels is shown in FIG. 5(a). If the result of any of the three comparisons is negative, then further comparisons must be made to detect whether a descending edge is present.

Figure 5C:
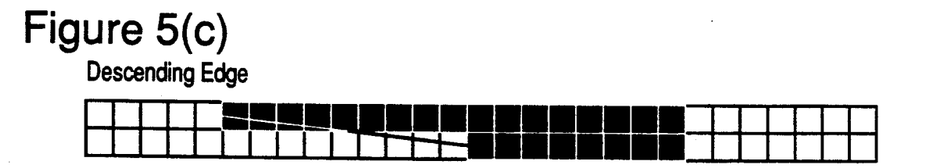
FIGS. 5(c), and 5(d) show two rows of pixels containing a horizontal descending edge before and after, respectively, application of a smoothing method according to an embodiment of the invention.
Figure 5D:
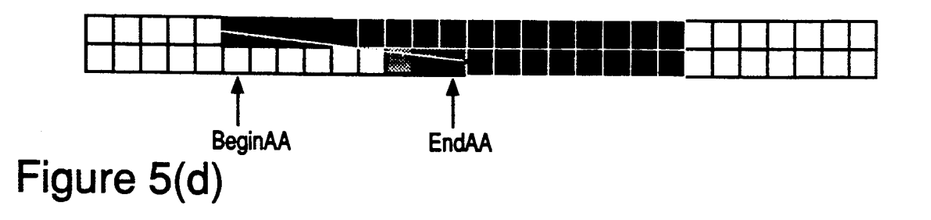

In the latter case, a third set of three comparisons 314 are made. The first comparison is whether TopPixelColor is the same as LowPixelColor. The second comparison is whether LowPixelColor is different from LastLowColor. The third comparison is whether TopPixelColor is the same as LastTopColor. If the result of all of these comparisons is affirmative, then a descending edge has been detected as shown by block 321. This information is stored in Mode as shown by block 380. The presence of a descending edge in two rows of pixels is shown in FIG. 5(c). If the result of any of the three comparisons is negative, then, at this stage of the process, it can not be determined whether a bottom or descending edge is present. Additional pixel data must be considered and further comparisons made in order to determine which of the two is present.

If it cannot yet be determined whether a bottom or descending edge is present, a determination is made as to whether the end of the line has been reached as shown by block 316. If the end of the line has not been reached, then the current position is shifted one column to the right and stored in CurrentAA as shown by block 315. The value of TopPixelColor is stored in LastTopColor and the value of LowPixelColor is stored in LastLowColor as shown by block 312. The data in the current column of row 1 is stored as TopPixelColor and the data in the current column of row 2 is stored as LowPixelColor as further shown by block 312. The second set of three comparisons 313 described above are made. If the result of each of the three is affirmative, then a bottom edge has been detected as shown by block 320. If one of the three comparisons is negative, then the third set of three comparisons 314 are made. All affirmative results indicates a descending edge as shown by block 321. One negative result necessitates more pixel data and comparisons to determine whether the edge is a bottom or descending edge. The process described above is repeated until it is determined whether a bottom or descending edge is present. In either case, the type of edge detected is stored in Mode as shown by block 380.

If the result of any of the first set of three comparisons 310 described above is negative, then a fourth set of three comparisons 350 must be made in order to determine if a top or ascending edge is present. The first comparison is whether TopPixelColor is the same as LastTopColor. The second comparison is whether LowPixelColor is different from LastLowColor. The third comparison is whether LastLowColor is the same as LastTopColor. If the result of all three comparisons is affirmative, then either an ascending edge or a top edge has been detected. If the result of any of the three comparisons is negative, then the value of TopPixelColor is stored in LastTopColor and the value of LowPixelColor is stored in LastLowColor as shown by Block 390. A determination is made as to whether the end of the line (i.e., the last column) has been reached as shown by block 391.

If an ascending or top edge has been detected, the value in CurrentAA is stored in BeginAA, then the current position is shifted one column to the right and stored in CurrentAA as shown by block 351. The value of TopPixelColor is stored in LastTopColor and the value of LowPixelColor is stored in LastLowColor as shown by block 352. The data in the current column of row 1 is stored as TopPixelColor and the data in current column of row 2 is stored as LowPixelColor as further shown by block 352.

Figure 5E:
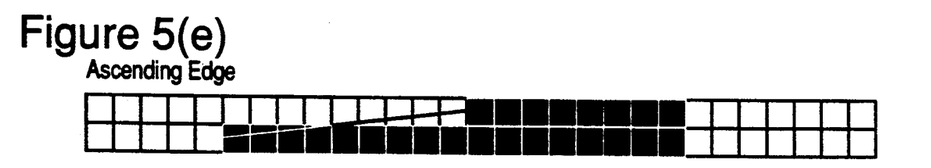
FIGS. 5(e) and 5(f) show two rows of pixels containing a horizontal ascending edge before and after, respectively, application of a smoothing method according to an embodiment of the invention.
Figure 5F:
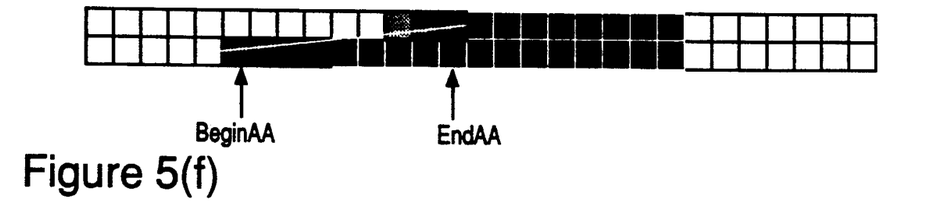

It must be determined whether the detected edge is a top edge or an ascending edge. The second set of three comparisons described above are made. For this portion of the edge detection method, this set of three comparisons is shown by block 353. If the result of all of these comparisons is affirmative, then an ascending edge has been detected as shown by block 360. This information is stored in Mode as shown by block 380. The presence of a ascending edge in two rows of pixels is shown in FIG. 5(e). If the result of any of the three comparisons is negative, then further comparisons must be made to detect whether a top edge is present.

Figure 5G:
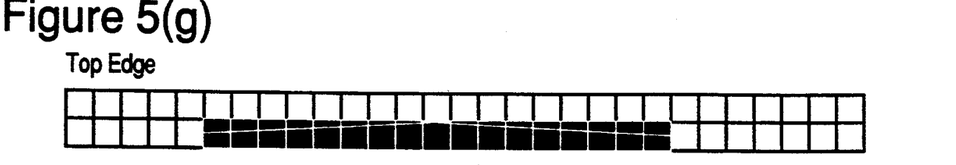
FIGS. 5(g) and 5(h) show two rows of pixels containing a top edge before and after, respectively, application of a smoothing method according to an embodiment of the invention.
Figure 5H:
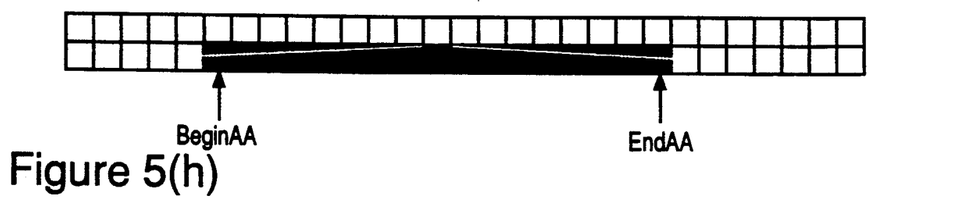

In the latter case, the third set of three comparisons described above are made. For this portion of the edge detection method, this set of three comparisons is shown by block 354. If the result of all of these comparisons is affirmative, then a top edge has been detected as shown by block 361. This information is stored in Mode as shown by block 380. The presence of a top edge in two rows of pixels is shown in FIG. 5(g). If the result of any of the three comparisons is negative, then, at this stage of the process, it can not be determined whether an ascending or top edge is present. Additional pixel data must be considered and further comparisons made.

If it cannot yet be determined whether an ascending or top edge is present, a determination is made as to whether the end of the line has been reached as shown by block 356. If the end of the line has not been reached, then the current position is shifted one column to the right and stored in CurrentAA as shown by block 355. The value of TopPixelColor is stored in LastTopColor and the value of LowPixelColor is stored in LastLowColor as shown by block 352. The data in the current column of row 1 is stored as TopPixelColor and the data in the current column of row 2 is stored as LowPixelColor as further shown by block 352. The second set of three comparisons 353 described above are made. If the result of each of the three is affirmative, then an ascending edge has been detected as shown by block 360. If one of the three comparisons is negative, then the third set of three comparisons 354 are made. All affirmative results indicates a top edge as shown by block 361. One negative result necessitates more pixel data and comparisons to determine whether the edge is an ascending or top edge. The process described above is repeated until it is determined whether an ascending or top edge is present. In either case, the type of edge detected is stored in Mode as shown by block 380.

Figure 5I:
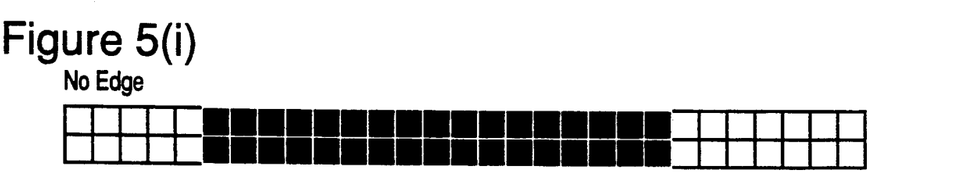
FIGS. 5(i) and 5(j) show two rows of pixels containing no edge before and after, respectively, application of a smoothing method according to an embodiment of the invention.
Figure 5J:
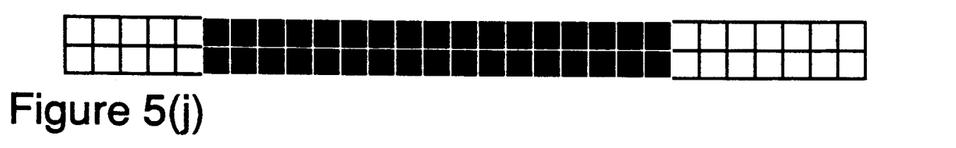

If a negative result is found in each of the first set of comparisons 310 and fourth set of comparisons 350, then no edge has been detected. The occurrence of this situation is shown in FIG. 5(i).

If, after finding a negative result in both the first set of comparisons 310 and the fourth set of comparisons 350, it is determined that the end of a line (i.e., the last column) has been reached, then the current position is lowered by one row and restarted at the first column as shown by block 394. Detection of edges in the now current two rows proceeds as described above. Thus, after completion of a scan through rows 1 and 2, a new scan would begin with row 2 as the top row and row 3 as the bottom row. Detection of edges would occur for this set of rows exactly as previously described. Upon completion of the scan of rows 2 and 3, a new scan would begin with row 3 as the top row and row 4 as the bottom row. Successive decrementing of the row number occurs in this way until the last two rows have been scanned.

After the last two rows of pixel data have been scanned, the horizontal scan 200 is complete. As previously noted, the number of rows in the pixel grid is known prior to the beginning of application of the method according to the invention. Data indicating the number of rows and columns is accessed and stored in V and H, respectively, as shown by block 201, prior to the beginning of edge detection 203. When the end of a line is detected in one of blocks 316, 356 or 391, a check is made to determine whether the current bottom row is equal to the last row in the pixel grid as shown by block 393. If not, then the current position is set to the first column of the next two lower rows as described above and shown by block 394. If so, then the vertical scan 250 is begun. The vertical scan 250 occurs in an analogous way to the horizontal scan 200. Rather than scanning across columns of two row sets, scanning is performed across rows of two column sets.

Note that only edges inclined at less than or equal to 45° angle from the horizontal are detected by the horizontal scan 200. This is because for edges with an incline greater than 45°, pixel color will change from the first edge color to the second edge color at the same column location in the two rows being scanned. Thus, the horizontal scan 200 will not detect an edge. For a similar reason, only edges inclined at greater than or equal to 45° angle from the horizontal are detected by the vertical scan 250.

A special case arises for edges with a slope of exactly 45° from the horizontal. This edge could be detected by either the horizontal scan 200 or the vertical scan 250. Since both scans will detect such an edge, the edge will be smoothed twice. Theoretically, this redundant smoothing will yield inferior results, though, in practice, it turns out that this is only a problem when the adjacent colors at the edge are sharply contrasting.

Figure 6:
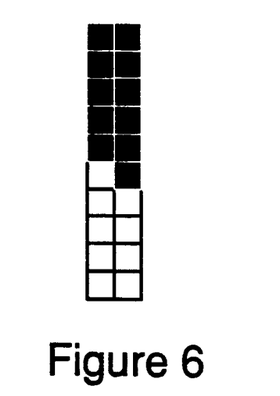
FIG. 6 shows two columns of pixels during a vertical scan.

In one embodiment according to the invention, this problem is eliminated by suppressing the detection of such an edge when it occurs during the vertical scan 250. This is done by testing the difference between BeginAA and EndAA after an edge has been detected during the vertical scan 250. If this difference is equal to 1, then a 45° edge has been detected and the edge is ignored as shown by block 420 in FIG. 4(a). FIG. 6 shows one example of this situation for two columns of pixels during the vertical scan 250.

FIG. 2 shows that after edges are detected they are smoothed as shown by blocks 204, 253. In one embodiment of the invention, immediately after an edge is detected and identified as a particular type (e.g., top, bottom, ascending, descending), smoothing of the edge occurs. After smoothing of the edge, the current position is shifted to the right as shown by block 385, and edge detection begins again. In another embodiment of the invention, after an edge is detected and identified by type, the type and location of the edge is stored. At the completion of the detection of all edges, each detected edge is successively smoothed.

Figure 1C:
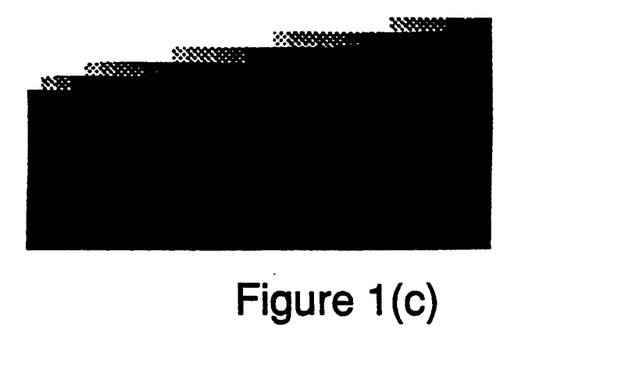
FIG. 1(c) shows the detailed section of an image of FIG. 1(b) after smoothing the jagged edges according to an embodiment of the invention.
Figure 4A:
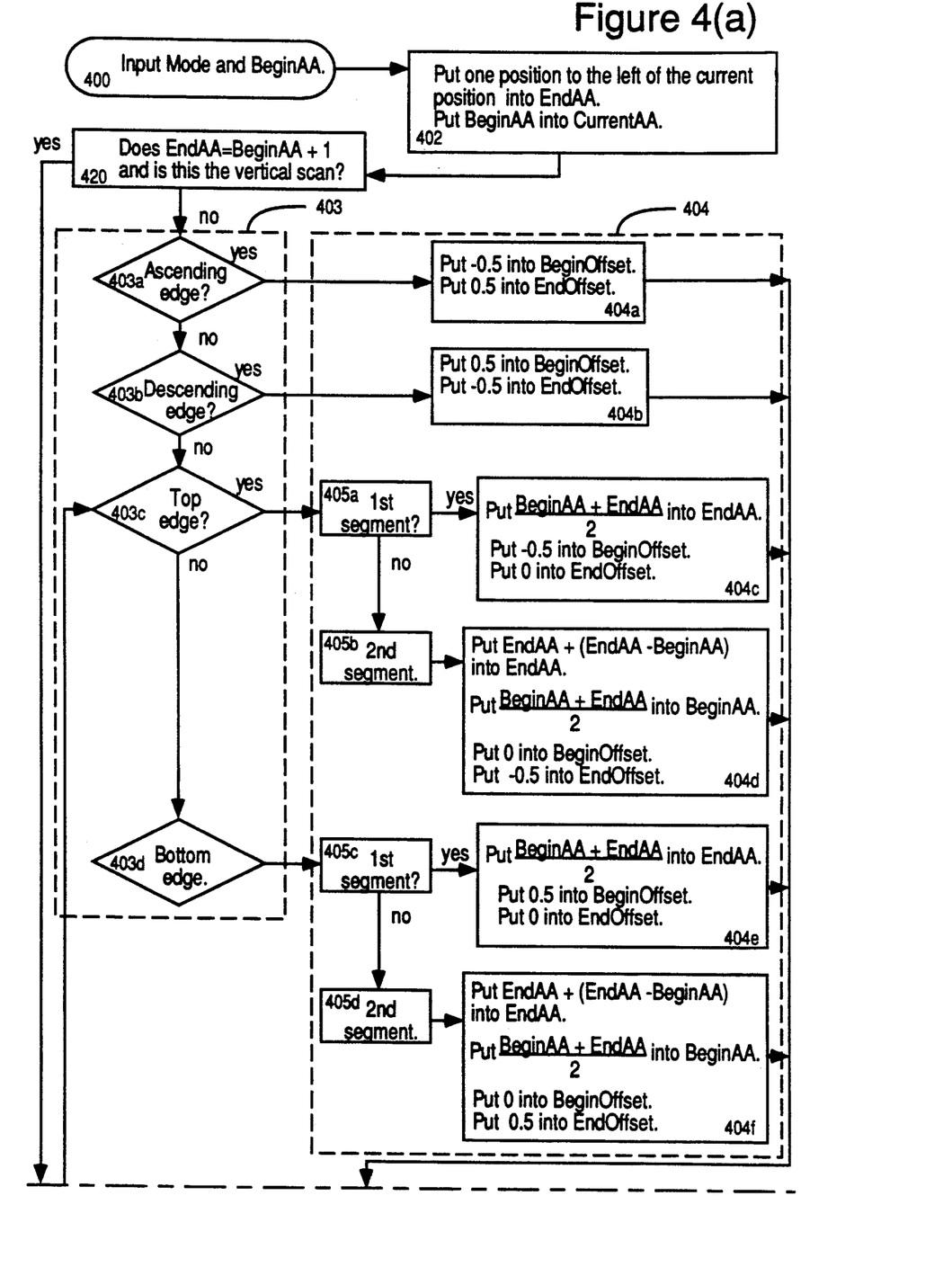
FIGS. 4(a) and 4(b) are block diagrams of the edge smoothing portion of the horizontal scan of the method shown in FIG. 2.
Figure 4B:
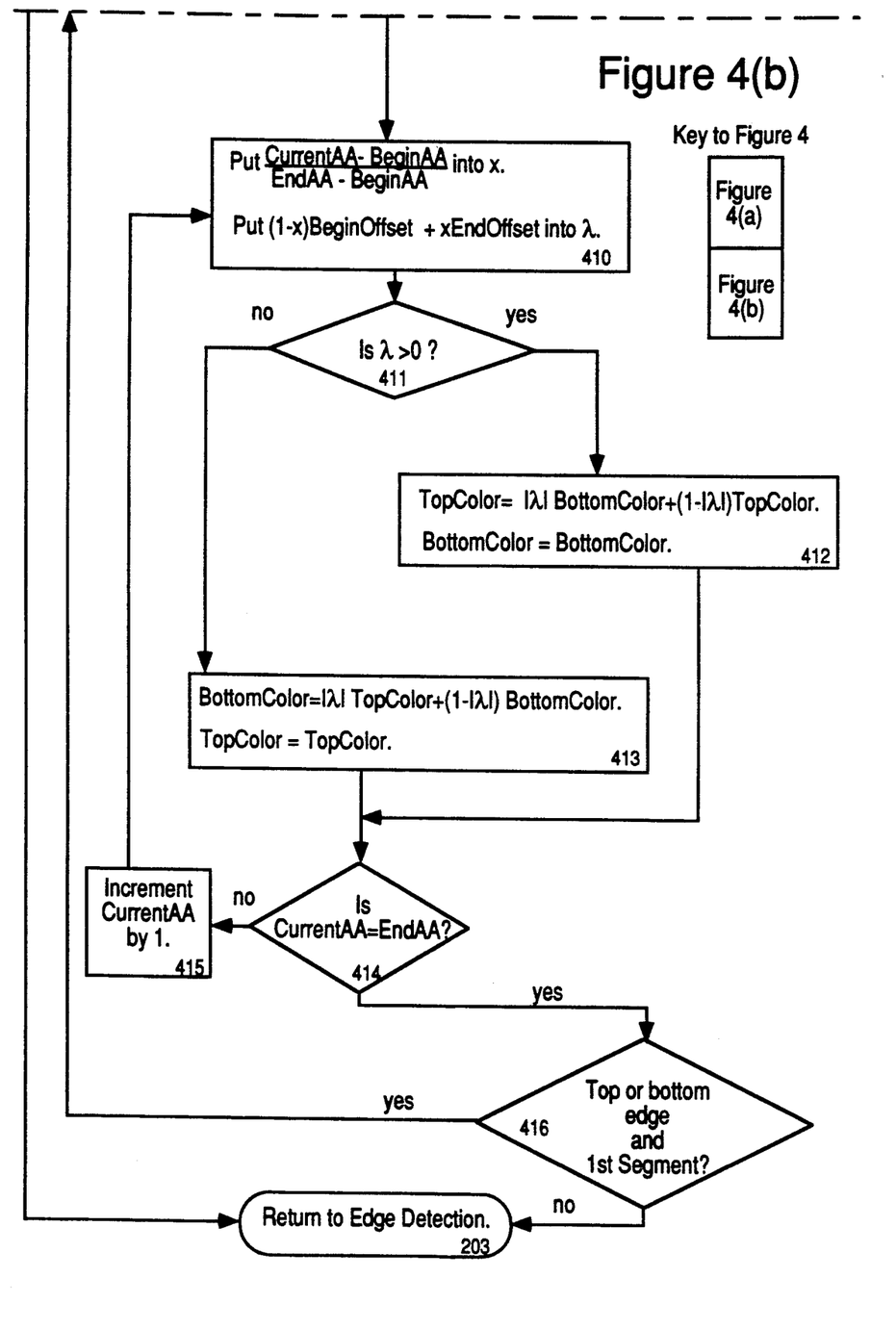

FIG. 4 shows a block diagram of the edge smoothing portion 204 of the method of FIG. 2. Smoothing of jagged edges is not accomplished by changing the shape or size of the pixel in some way. Rather, the smoothing method changes the color of pixels in the region of the edge so as to achieve a gradual transition between colors at the edge. This gradual transition tricks the eye of the viewer into perceiving the edge as being smoother. The result of smoothing according to this embodiment of the invention is shown in FIG. 1(c) for the detailed section of an image with jagged edges shown in FIG. 1(b).

As described above, edges are detected as certain changes in color of adjacent pixels. Each pixel color is a combination of several components of a type of color representation. A change in any of the components greater than a threshold amount results in the detection of a color change. In contrast, once a color change has been detected, all of the components of a color representation are smoothed, not just the component or components which gave rise to the detection of a color change. Each of these components is smoothed individually in the manner described below.

When the presence of an edge is detected, the position at the time of detection of that edge is stored in BeginAA as shown at blocks 311 and 351. In the embodiment of the invention in which smoothing of an edge occurs immediately after the type of edge is identified, the position immediately prior to the current position (i.e., the "end" of the edge insofar as the edge exists in the two rows or columns being scanned) is stored in EndAA at the beginning of the smoothing method as shown by block 402. Alternatively, where smoothing is done after all edges are detected, an array of BeginAA and EndAA values would exist at the beginning of the smoothing method, one set of values for each edge detected by the method. Each set of BeginAA and EndAA values would then be retrieved and the associated jagged edge smoothed.

BeginAA and EndAA define the region (i.e., the beginning and end of the edge) in which the color of pixels will be adjusted to smooth the image. For edges detected during the horizontal scan 200, this region will be a plurality of columns of pixels in the two rows in which the edge was detected. For edges detected during the vertical scan 250, this region will be a plurality of columns of pixels in the two columns in which the edge was detected.

After BeginAA and EndAA have been determined, the location stored in BeginAA is set as the current position, CurrentAA, as shown by block 402. Next, one of four sets of values are used to define BeginOffset and EndOffset as shown generally by the dashed region 404. These two values will be used in determining the new color of each pixel. Which of the four sets of values are used depends on what type of edge is to be smoothed. As described above, the type of edge (bottom, top, descending, ascending) is given by the value currently stored in Mode. From the value stored in Mode, the type of edge is identified as shown by block 403. If an ascending edge is to be smoothed, BeginOffset is set equal to −0.5 and EndOffset is set equal to 0.5 as shown by blocks 403a and 404a. For a descending edge, BeginOffset is set equal to 0.5 and EndOffset is set equal to −0.5 as shown by blocks 403b and 404b. For top and bottom edges, the situation is a little more complicated.

As previously noted, BeginAA and EndAA define the beginning and end locations of a sequence of pixels which will have their color adjusted in order to smooth the image. In the case of top and bottom edges, pixel colors are changed in two separate successive segments, rather than one segment as is the case for ascending or descending edges. Thus, a set of BeginAA and EndAA values must be established for each segment. Additionally, a set of BeginOffset and EndOffset values must be established for each segment.

For the first segment of a top edge, determined as shown by block 405a, the column value of BeginAA is left equal to the original column value of BeginAA determined as discussed above and as shown by block 404c. The column value of EndAA is modified to be equal to the midpoint of the originally determined column values of BeginAA and EndAA (i.e., (BeginAA+EndAA)/2)) as shown by block 404c. BeginOffset is set equal to −0.5 and EndOffset is set equal to 0 as shown by block 404c.

For the second segment of a top edge, determined as shown by block 405b, the column value of BeginAA is modified to be equal to the midpoint of the originally determined column values of BeginAA and EndAA as shown by block 404d. The column value of EndAA is made equal to the original column value of EndAA determined as discussed above and as shown by block 404d. BeginOffset is set equal to 0 and EndOffset is set equal to −0.5 as shown by block 404d.

For the first segment of a bottom edge, determined as shown by block 405c, the column value of BeginAA is left equal to the original column value of BeginAA determined as discussed above and as shown by block 404e. The column value of EndAA is modified to be equal to the midpoint of the originally determined column values of BeginAA and EndAA (i.e., (BeginAA+EndAA)/2)) as shown by block 404e. BeginOffset is set equal to 0.5 and EndOffset is set equal to 0 as shown by block 404e.

For the second segment of a bottom edge, determined as shown by block 405d, the column value of BeginAA is modified to be equal to the midpoint of the originally determined column values of BeginAA and EndAA as shown by block 404f. The column value of EndAA is made equal to the original column value of EndAA determined as discussed above and as shown by block 404f. BeginOffset is set equal to 0 and EndOffset is set equal to 0.5 as shown by block 404f.

For each located edge, particular values of BeginAA, EndAA, BeginOffset and EndOffset are defined as described above. Pixel colors are changed in the region of the edge as a function of those four values according to the set of equations below.

$$x = (CurrentAA - BeginAA)/(EndAA - BeginAA)$$

$$\lambda = [(1-x) * BeginOffset] + [x * EndOffset]$$

For $\lambda > 0$,

TopColor=$[|\lambda| *$ BottomColor$]+[(1-|\lambda|) *$ TopColor$]$
BottomColor = BottomColor For $\lambda \leq 0$, TopColor = TopColor
BottomColor=$[|\lambda| *$ TopColor$]+[(1-|\lambda| *$ BottomColor$]$ To begin the calculation of new pixel colors for a particular column location (row location in the vertical scan 250), a value for x is calculated for the current position as shown by block 410. Then, a value of $\lambda$ is calculated as a function of x as shown by block 410. A determination is made whether $\lambda$ is greater or less than zero as shown by block 411. If $\lambda$ is greater than zero, then the color of the top pixel is adjusted as defined by the equation above for TopColor and the color of the bottom pixel is left unchanged as shown by block 412. If $\lambda$ is less than or equal to zero, then the color of the bottom pixel is adjusted as defined by the equation above for BottomColor and the color of the top pixel is left unchanged as shown by block 413. However, note that when $\lambda$ equals zero, the first set of equations for new pixel colors could equally well have been used, since they yield the same result as the bottom set of equations for this particular case.

Once the colors of the top and bottom pixels have been changed at the current position, a determination is made as to whether CurrentAA equals EndAA) as shown by block 414. If not, then the current position is shifted one column to the right as shown by block 415. Once again, values for x, $\lambda$, TopColor and BottomColor are calculated and used to change the color of the pixels at the now current position. This process is repeated until CurrentAA equals EndAA. If CurrentAA equals EndAA, and a top or bottom edge is being smoothed, then the smoothing of the second segment of the edge is begun (if not previously done) as shown by block 416. Otherwise, detection of edges, as shown by block 203, begins again.

According to one embodiment of the invention, once an edge is detected, that edge is immediately smoothed. When smoothing of the edge is complete, the search for additional edges continues. If another edge is detected, that edge is immediately smoothed. This process is repeated until all edges have been detected and smoothed, both in the horizontal scan 200 and the vertical scan 250.

According to another embodiment of the invention, all edges are first detected in the horizontal and vertical edge detection scans 203, 252. Once all edges have been detected, smoothing of the detected edges begins. Each edge is sequentially smoothed until all detected edges have been smoothed.

According to yet another embodiment of the invention, horizontal edges are first detected in the horizontal scan 200. When the horizontal edge detection scan 203 is complete, the detected edges are smoothed as shown by Block 204. The vertical scan 250 is then begun and all vertical edges are detected as shown by block 252. After detection of all edges in the vertical scan 250, these edges are smoothed as shown by Block 253.

FIGS. 5(b), 5(d) 5(f) 5(h) and 5(j) show respectively, the edges of FIGS. 5(a), 5(c), 5(e), 5(g) and 5(i) after smoothing according to this embodiment of the invention. As can be seen in these figures, smoothing is accomplished by changing the color of pixels near the edge to various shades of color intermediate between the two colors that form the edge interface. For instance, in FIG. 5(d), in the top row of pixels the beginning of the series of black pixels has been changed into a series of pixels with gradually darkening shades of gray. In the bottom row of pixels, a series of pixels with gradually darkening shades of gray has been added before the beginning of the series of black pixels. Each row of pixels thus transitions gradually from white to black over a range of pixels, rather than abruptly from one pixel to the next. Further, the transition in the top row of pixels extends from the beginning of the edge (the location at which the edge was first detected) to the middle of the edge and the transition in the bottom row of pixels extends from the middle of the edge to the end of the edge (the location at which the type of edge is determined). Though these figures show smoothing of edges with a black/white interface, it is emphasized that the smoothing method is equally applicable to edges with interface colors of any type and represented in any way.

As each edge is smoothed, the new colors for pixels near the edge are stored in the appropriate memory locations in the RAM. In one embodiment according to the invention, upon completion of the horizontal and vertical scans 200, 250 of the image (and the associated smoothing), the smoothed pixel data is transferred back to the non-volatile storage medium. This pixel data is then used to redraw the image with smoothed jagged edges. This is shown by Block 299. Using this approach, even images with very large pixel grids may be redrawn easily since the memory capacity limitations associated with the RAM are not a factor.

Alternatively, in another embodiment according to the invention, if memory capacity does not prohibit, the image may be redrawn directly from RAM before the data is transferred back to the non-volatile storage medium. This approach is also encompassed by Block 299. This approach has the advantage of being faster both because it is quicker to draw an image from RAM than it is from a non-volatile storage medium, and because the extra step of transferring pixel data from the RAM to the non-volatile storage medium has been eliminated.

Above, various embodiments of the invention have been described. The descriptions are intended to be illustrative, not limitative. Thus, it will be apparent to one skilled in the art that certain modifications may be made to the invention as described without departing from the scope of the claims set out below.

We claim:

1. A method for detecting jagged edges in an image represented by a rectangular array of pixels, the method comprising the steps of:
   accessing a first group of pixel data from a data storage device, the first group of pixel data comprising a first set of pixel data and a second set of pixel data, wherein:
      the first and second sets of pixel data are successive sets of pixel data from adjacent columns or adjacent rows; and
      the successive sets of pixel data comprise pixel data for two adjacent pixels in each row or column;
   determining a first difference between the value of the pixel data for a first pixel of the first set and the value of the pixel data for a first pixel of the second set;
   determining a second difference between the value of the pixel data for a second pixel of the first set and the value of the pixel data for a second pixel of the second set;
   determining, based upon the comparison of the first and second sets of pixel data, whether a jagged edge is present in the image;
   accessing a second group of pixel data from the data storage device, the second group of pixel data comprising a third set of pixel data and a fourth set of pixel data, wherein:
      the third and fourth sets of pixel data are successive sets of pixel data from adjacent columns or adjacent rows; and
      the successive sets of pixel data comprise pixel data for two adjacent pixels in each row or column;
   determining a third difference between the value of the pixel data for a first pixel of the third set and the value of the pixel data for a first pixel of the fourth set;
   determining a fourth difference between the value of the pixel data for a second pixel of the third set and the value of the pixel data for a second pixel of the fourth set; and
   determining, based upon the comparison of the first and second sets of pixel data, and the comparison of the third and fourth sets of pixel data, the type of jagged edge present in the image.

2. A method as in claim 1, wherein:
   the step of determining whether a jagged edge is present in the image further comprises:
      comparing the first difference to a predetermined threshold value;
      comparing the second difference to a predetermined threshold value; and
      determining that a jagged edge is present in the image if exactly one of the first or second difference is greater than the threshold value;
   the step of determining the type of jagged edge present in the image further comprises:
      comparing the third difference to a predetermined threshold value;
      comparing the fourth difference to a predetermined threshold value, exactly one of the third or fourth difference being greater than the threshold value; and
      determining the type of jagged edge by determining which of the first and second differences is greater than the threshold value and which of the third and fourth differences is greater than the threshold value.

3. A method as in claim 2, wherein the types of jagged edges include a top jagged edge, a bottom jagged edge, a descending jagged edge and an ascending jagged edge.

4. A system for detecting jagged edges in an image represented by a rectangular array of pixels, the system comprising:
   means for accessing a first group of pixel data from a data storage device, the first group of pixel data comprising a first set of pixel data and a second set of pixel data;
      the first and second sets of pixel data are successive sets of pixel data from adjacent columns or adjacent rows; and
      the successive sets of pixel data comprise pixel data for two adjacent pixels in each row or column.
   means for determining a first difference between the value of the pixel data for a first pixel of the first set and the value of the pixel data for a first pixel of the second set;
   means for determining a second difference between the value of the pixel data for a second pixel of the first set and the value of the pixel data for a second pixel of the second set;
   means for determining, based upon the comparison of the first and second sets of pixel data, whether a jagged edge is present in the image;
   means for accessing a second group of pixel data from the data storage device, the second group of pixel data comprising a third set of pixel data and a fourth set of pixel data, wherein:
      the third and fourth sets of pixel data are successive sets of pixel data from adjacent columns or adjacent rows; and
      the successive sets of pixel data comprise pixel data for two adjacent pixels in each row or column
   means for determining a third difference between the value of the pixel data for a first pixel of the third set and the value of the pixel data for a first pixel of the fourth set; and
   means for determining a fourth difference between the value of the pixel data for a second pixel of the third set and the value of the pixel data for a second pixel of the fourth set; and
   means for determining, based upon the comparison of the first and second sets of pixel data, and the comparison of the third and fourth sets of pixel data, the type of jagged edge present in the image.

5. A system as in claim 4, wherein:
the means for determining whether a jagged edge is present in the image further comprises:
means for comparing the first difference to a predetermined threshold value;
means for comparing the second difference to a predetermined threshold value; and
means for determining that a jagged edge is present in the image if exactly one of the first or second difference is greater than the threshold value;
the means for determining the type of jagged edge present in the image further comprises:
means for comparing the third difference to a predetermined threshold value;
means for comparing the fourth difference to a predetermined threshold value, exactly one of the third or fourth difference being greater than the threshold value; and
means for determining the type of jagged edge by determining which of the first and second differences is greater than the threshold value and which of the third and fourth differences is greater than the threshold value.

6. A system as in claim 5, wherein the types of jagged edges include a top jagged edge, a bottom jagged edge, a descending jagged edge and an ascending jagged edge.

* * * * *